(12) United States Patent
Bi et al.

(10) Patent No.: US 10,634,645 B2
(45) Date of Patent: Apr. 28, 2020

(54) EDDY CURRENT PROBE WITH 3-D EXCITATION COILS

(71) Applicants: Xiaopeng Bi, Pittsburgh, PA (US); Stanley Zuo, Danville, IL (US); Yue Huang, East Lansing, MI (US)

(72) Inventors: Xiaopeng Bi, Pittsburgh, PA (US); Stanley Zuo, Danville, IL (US); Yue Huang, East Lansing, MI (US)

(73) Assignee: LabSys LLC, East Lansing, MI (US)

( * ) Notice: Subject to any disclaimer, the term of this patent is extended or adjusted under 35 U.S.C. 154(b) by 160 days.

(21) Appl. No.: 15/995,443

(22) Filed: Jun. 1, 2018

(65) Prior Publication Data

US 2019/0369055 A1   Dec. 5, 2019

(51) Int. Cl.
*G01N 27/90*   (2006.01)

(52) U.S. Cl.
CPC ................ *G01N 27/9033* (2013.01)

(58) Field of Classification Search
CPC .............. G01N 27/90; G01N 27/9033; G01N 27/9006; G01N 29/2412
See application file for complete search history.

(56) References Cited

U.S. PATENT DOCUMENTS 5,329,269 A * 7/1994 Watson .............. G01R 33/0206
29/609
2013/0009632 A1* 1/2013 Yamamoto ......... G01N 27/9046
324/222
2013/0076348 A1* 3/2013 Ide .................... G01N 27/90
324/232
2014/0002070 A1* 1/2014 Michaeu-Cunningham ...............
G01N 27/902
324/240

FOREIGN PATENT DOCUMENTS

| FR | 2 790 556 A1 | 9/2000 |
| JP | 2017-181412 A | 10/2017 |
| WO | 2017/061156 A1 | 4/2017 |

* cited by examiner

*Primary Examiner* — Son T Le

(57) ABSTRACT

An eddy current probe for nondestructive evaluation of an object made of an electrically conductive material with a planar or curved surface, comprising: an excitation portion, consisting of a plurality of multi-turn conductive coils and a bar core, the bar core having a primary surface in proximity to the outer surface of the object to be inspected, each multi-turn coil formed by winding a conductor along the core with each wound equally spaced and parallel on the primary surface of the core, multi-turn coils intersecting from one to another on the primary surface of the core and forming a plurality of congruent grid shapes with the winding conductors, each multi-turn coil is energized by an AC current with each of AC currents at a phase difference from one to another; and a sensing portion, consisting of a plurality of magnetic field sensors with each of the sensors positioned in proximity to the symmetric center of congruent grid shapes, each magnetic field sensor having a sensitivity axis is placed with its sensitivity axis in the direction substantially orthogonal to the primary surface.

20 Claims, 6 Drawing Sheets

EDDY CURRENT PROBE WITH 3-D EXCITATION COILS

FIELD OF THE INVENTION

The invention relates to eddy current probes for non-destructive evaluation and, more particularly, to such probes employing magnetic field sensors.

BACKGROUND OF THE INVENTION

Non-destructive evaluation (NDE) has been crucial to inspecting buried material defects and monitoring operational safety of key structures such as airplane wing splices, automobile engines, and oil pipelines. Accurate identification and characterization of material defects such as fatigue flaws, surface and subsurface cracks, pitting, and stress or corrosion induced damage precursors (e.g. material property inconsistency) is of great importance to avoiding unexpected sudden failure of structures. Eddy current based NDE techniques are well known for inspection of conductive materials in the industry. The inspection is carried out by sensing the variation of out-of-surface magnetic field resulted from the disturbance of eddy currents by the defects. In conventional eddy current probes, an excitation coil is used to produce a magnetic field which is able to induce an eddy current in the material that is being inspected, and another circularly wound inductive coil is employed as the receiving coil to detect the out-of-surface magnetic field. However, the spatial resolution of such probes is severely limited by the size of the receiving coil, which has been a significant drawback.

The discovery of magnetoresistive effect and the development of micro and nanofabrication technologies have led to an advancement of miniaturized solid-state magnetic field sensors, such as giant magnetoresistive (GMR) sensors and tunnel magnetoresistive (TMR) sensors, which show high sensitivity to magnetic field and can be fabricated as small as tens of micrometers. Replacing the conventional receiving coils by such magnetic field sensors offers significantly higher inspection accuracy and can effectively boost the spatial resolution. However, one of the challenging situations for adapting magnetic field sensors in eddy current probes is that they cannot discriminate the sensed magnetic field as can the conventional circularly wound inductive coil, if the magnetic field produced directly by the excitation coils can also be detected by the sensors in addition to the field of interest produced by the eddy current that is to be measured. Such magnetic field produced by the excitation coils can be deemed a background noise field, which deviates magnetic field sensors away from their most linear region and lowers their detection accuracy. In worse case scenario, the background noise field saturates the magnetic field sensors and causes them to completely lose their sensitivity. Prior art (U.S. Pat. No. 7,952,348B2) employed planar spiral conductive coils/traces as the excitation coils and coupled magnetic sensors with their sensitivity axes in parallel to the surface of the test object for the purpose of avoiding the interference from its planar excitation coils, which intrinsically produce excitation magnetic fields out of and orthogonal to the coil plane. These planar excitation coils are naturally unfavourable to magnetic sensors with their sensitivity axes orthogonal to the test object surface. With the planar excitation coil, one faces a difficult situation of placement of magnetic sensors, by choosing either a weak magnetic field signal component in parallel to the object surface from the eddy current with the least interference from the excitation coil or the strongest magnetic field signal component orthogonal to the object surface from the eddy current with the most interference from the excitation coil. Either way the signal-to-noise ratio of this eddy current probe made with the planar spiral excitation coil is not ideal. Another instance, prior art (US20140312891A1) introduced an eddy current probe for tubular inspection, comprising two circular arrays of excitation coils that created a region without radial component of magnetic field. An array of radially sensitive magnetoresistive sensors were circularly placed in that region for the purpose of avoiding the interference from the excitation magnetic field. One of the disadvantages in that configuration is that the area being inspected is not in close proximity to the excitation coils. Therefore the eddy current produced is relatively weak, which also lowers the signal-to-noise ratio and weakens the sensitivity of the test probe. In addition, the prior art requires two driving modes with multiplexing circuitry in order to inspect axial and circumferential defects, which makes the probe structure cumbersome and operation somewhat complicated.

SUMMARY OF THE INVENTION

To overcome aforesaid shortcomings, this invention introduces an eddy current probe including a novel configuration of excitation coils and magnetic field sensors. At least two excitation coils intersecting each other are employed to produce a rotating magnetic field that can induce a rotating eddy current in the area of structure being inspected. A plurality of magnetic field sensors are arranged in proximity to the coil-intersecting area and positioned with their sensitivity axes aligned with the normal direction to the coil surface, in order to avoid the interference from the excitation magnetic field. Both excitation coils and magnetic field sensors are placed in close proximity to the inspected structure to achieve a high sensitivity and a large signal-to-noise ratio. Such a probe is sensitive to any transverse flaws while operating in flat surface structure inspection, and to both axial and circumferential defects in curved surface or tubular inspection, without multiplexing circuitry.

In an exemplary embodiment of the invention there is an eddy current probe that is suitable to be operated on an object with a planar surface, as shown in FIG. 1, wherein the probe comprises an excitation portion for inducing an eddy current in the object being inspected, and a sensing portion for detecting the magnetic field produced by the induced eddy current. The excitation portion includes two excitation coils and a bar core of any shape, but an exemplary square bar core in this case. Two coils are formed by winding two conductors around the square bar core on the same four outer surfaces, respectively. Conductors of two coils cross each other on the bottom surface of the core in an angle, a 90 degree angle in this case, forming many congruent square grid shapes. The sensing portion consists of a plurality of magnetic field sensors which are placed in proximity to the symmetric center of the aforementioned square grid shapes, where the excitation magnetic field in the normal direction to the bottom surface is nearly net zero. Each sensor is placed with its sensitivity axis substantially aligned with the normal direction to the bottom surface of the core. The interference from the excitation magnetic field is therefore significantly avoided. By supplying two alternating currents with the same frequency and magnitude but a 90-degree phase difference, a rotating magnetic field is produced and a rotating eddy current in the area of the object being inspected is induced. The induced rotating eddy current is in turn influenced by the flaws contained in the object. As illustrated in FIG. 2, if a flaw exists in the object, the induced eddy current flows around the flaw when the path of the eddy current is blocked by it. Especially when an eddy current flows in perpendicular to the direction in which a flaw 21 extends, the path of the eddy current changes most significantly, curving around the flaw 21 as shown in FIG. 2A. Conversely, when an eddy current flow in parallel with the direction in which a flaw 21 extends, there is little influence on the path of the eddy current, as shown in FIG. 2B. Such disturbance of the eddy current leads to a variation of its induced magnetic field, which can be readily detected by the high sensitivity magnetic field sensors. Because the induced eddy current rotates in the plane that is parallel to the surface of the object, the eddy current probe is sensitive to any flaws transverse to the current.

In another exemplary embodiment of the invention there is an eddy current probe that is suitable to be operated inside a tube or on an object with a curved surface, as shown in FIG. 3, wherein the probe also comprises an excitation portion for inducing an eddy current in the object being inspected, and a sensing portion for detecting the magnetic field produced by the induced eddy current. The excitation portion includes two excitation coils and a bar core with a curved surface, but an exemplary tubular core in this case. Two coils are formed by winding two conductors around the tubular core on the same four surfaces, respectively. Conductors of two coils cross each other on the outer surface of the core in an angle, a 90 degree angle in this case, forming many congruent quasi-square grid shapes. The sensing portion consists of a plurality of magnetic field sensors which are placed in proximity to the symmetric center of the aforementioned quasi-square grid shapes, where the excitation magnetic field in the radial direction is nearly net zero. Each sensor is placed with its sensitivity axis aligned with the radial direction of the tubular core. The interference from the excitation magnetic field is therefore significantly avoided. By supplying two alternating currents with the same frequency and magnitude but a 90-degree phase difference, a rotating magnetic field is produced and a rotating eddy current in the area of the object tube being inspected is induced. The induced rotating eddy current is in turn influenced by the flaws contained in the wall of the object tube. Such influence on the eddy current leads to a variation of its induced magnetic field, which can be readily detected by the high sensitivity magnetic field sensors. Because the induced eddy current rotates as if in a plane tangent to the arc where the sensor locates and orthogonal to the radial direction, the eddy current probe is sensitive to flaws oriented in any direction in this plane depicted by the orthonormal circumferential and axial directions.

DETAILED DESCRIPTION OF THE INVENTION

The invention is illustrated in more details with references to following depicted exemplary embodiments. It should be understood that the present invention is not deemed to be limited thereto.

Figure 1A:
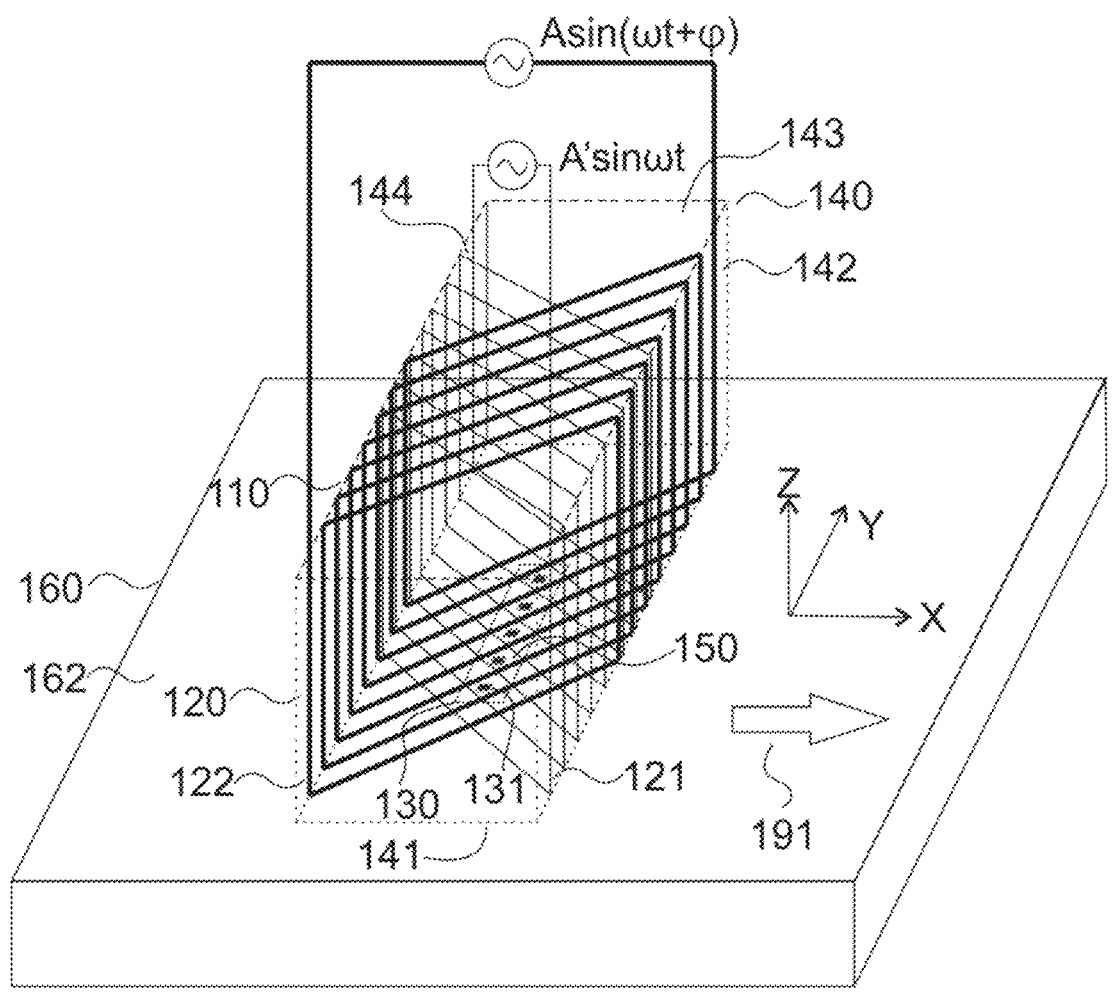
FIG. 1A is a 3D view of a first exemplary embodiment of the present invention, an eddy current probe suitable for an object with a planar surface.
Figure 1B:
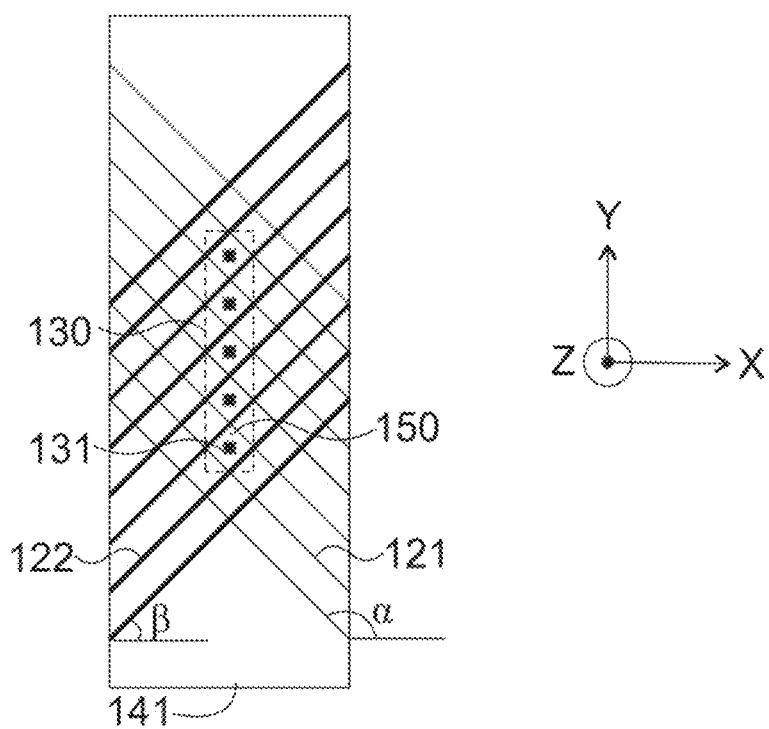
FIG. 1B is a bottom view of the first exemplary embodiment.
Figure 1C:
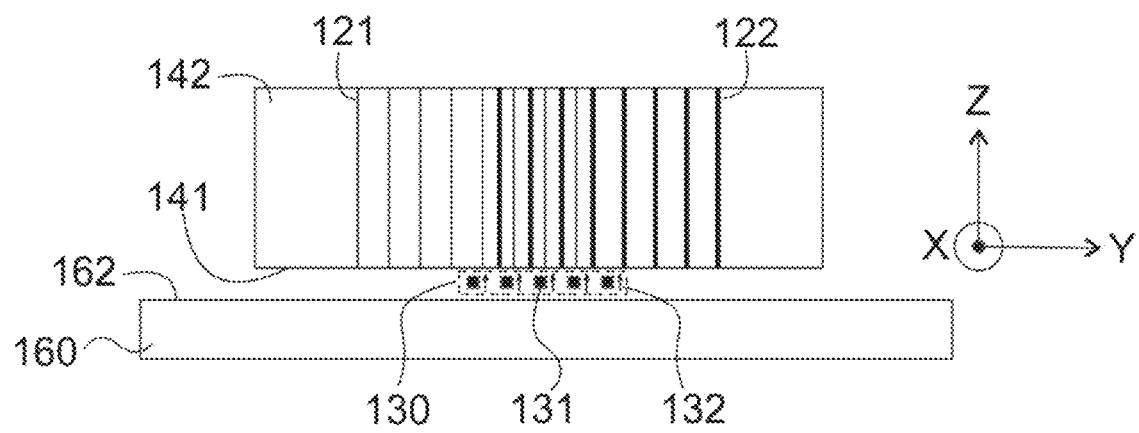
FIG. 1C is a side view of the first exemplary embodiment.
Figure 2A:
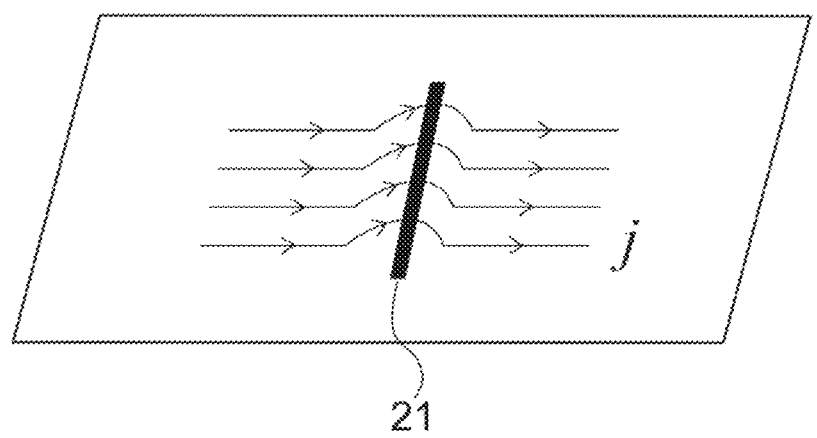
FIG. 2A shows how eddy current flow is disrupted when a straight linear flaw is presented; the direction of the flaw is perpendicular to the eddy current.
Figure 2B:
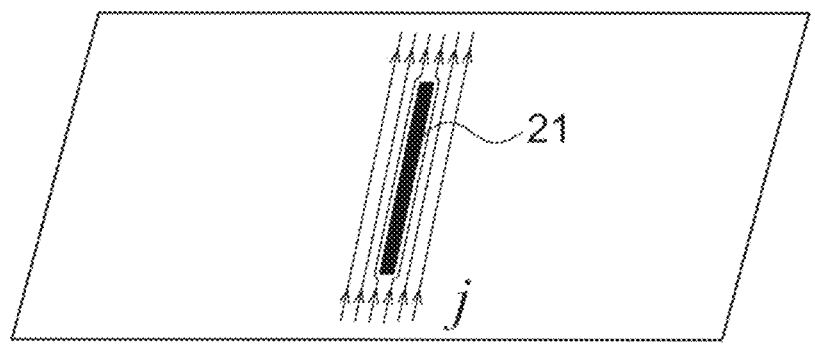
FIG. 2B shows the eddy current flow is slightly disrupted by the linear flaw when it is parallel to the eddy current.

FIGS. 1A, 1B and 1C show a structure configuration of a first exemplary embodiment of the present invention that is suitable being operated on an object with a planar surface. As shown in FIG. 1A, an eddy current probe 110 in accordance with this exemplary embodiment comprises an excitation portion 120 for inducing an eddy current in the area of an object 160 being inspected, and a sensing portion 130 for detecting the magnetic field produced by the induced eddy current. The object 160 is made of an electrically conductive material herein for an example. The top surface 162 of the object is planar and parallel to X-Y plane as shown in FIG. 1A.

The excitation portion 120 consists of a first excitation coil 121, a second excitation coil 122, and a square bar core 140 as an example made of a nonmagnetic substance. Each coil is formed by winding a conductor along the square bar core 140 in Y-axis direction, with each wound equally spaced on the outer surfaces 141, 142, 143, and 144 of the core. Surfaces 142 and 144 are both orthogonal to X-axis, and surfaces 141 and 143 are both orthogonal to Z-axis and parallel to the top surface 162 of the object 160. The bottom surface 141 faces to the top surface 162 of the object 160 and is called the primary surface in our description. The surfaces and the core are outlined in dashed lines shown in FIG. 1A. Though both coils 121 and 122 are wound on the same four surfaces, conductors of coil 121 cross the conductors of coil 122 on surface 141 and surface 143 in a 90-degree angle, for an example, from each other forming many congruent square grid shapes 150 on both surfaces 141 and 143. In general, a tilting angle α of coil 121 with respect to X-axis and angle β of coil 122 with respect to X-axis on the primary surface 141 are used to present how coils are wound on the surface of the core as shown in FIG. 1B. Except the first exemplary embodiment, other exemplary embodiments are also determined later in the present invention when coil 121 is not perpendicular to coil 122.

The sensing portion 130 consists of a plurality of magnetic field sensors 131, which can be selected from a variety of magnetic sensing apparatus. These magnetic field sensors are placed in proximity to the primary surface 141 and on the normal lines of the primary surface 141 at the symmetric centers of the aforementioned square grid shapes 150, as shown in FIG. 1B and 1C. The magnetic field sensors are also arranged along the square bar in Y-axis direction as an exemplary placement. Each sensor 131 has one sensitivity axis and is placed with its sensitivity axis aligned with Z-axis direction, as shown by the arrows 132 in FIG. 1C. All sensors only respond to the Z-axis component of a magnetic field with their sensitivity axes aligning to Z-axis and the magnetic signals are converted to electrical output signals in the end.

In accordance with this exemplary embodiment and unlike the planar excitation coils aforementioned in the prior art, the plane of each individual turn of excitation coils 121 and 122 is orthogonal to the object surface 162, and thus according to Biot-Savart law, most of the excitation magnetic fields produced by these two coils 121 and 122 at the sensor location lie in X-Y plane. The Z-axis component is not zero, however very small relative to the X and Y components, and is mainly from the coils on the primary surface 141 because of their proximity to the sensors. Such Z-axis component can be further avoided by placing the sensors on the normal lines of the primary surface 141 at the symmetric centers of the square grid shapes 150, because at these positions the Z-axis components of the excitation magnetic field from each of two pairs of adjacent parallel conductors cancel out from each other due to the symmetry of these square grid shapes.

Consequently, the resultant Z-axis component of the excitation magnetic field is net zero at sensor locations. Because the magnetic field sensors are chosen only to be sensitive to Z-axis magnetic field, they are immune to the interference from the excitation field that does not have a Z-axis component. Therefore, the magnetic field sensors 131 evidently work in a region without having to consider its nonlinearity and free of saturation and so as to significantly increase their overall measuring accuracy.

In accordance with this exemplary embodiment, the excitation coils 121 and 122 are energized by two out-of-phase AC currents with different magnitudes and phase shifts in general. As an exemplary embodiment, these two applied AC currents may have the same magnitude and frequency with 90 degrees of phase shift. Because of the pre-designed structure, a rotating excitation magnetic field in the X-Y plane is produced and a rotating eddy current in X-Y plane in the vicinity of the focused area of the object is induced. Both the trajectory of the magnetic field vector and the trajectory of the eddy current vector traces a circle in the X-Y plane. Meanwhile the induced eddy current in turn produces another magnetic field. The change in the path of the eddy current due to the existence of flaws in the object leads to a variation of the magnetic field produced by the eddy current and can be detected by the magnetic field sensors 131. Since the induced eddy current in the object 160 rotates in the X-Y plane, this exemplary embodiment of the eddy current probe 110 is sensitive to flaws oriented in any direction in the X-Y plane.

During the application of flaw inspection on the object 160, the eddy current probe 110 is connected to AC power sources for supplying the two AC currents with 90-degree phase shift to the excitation coils 121 and 122, respectively. A receiver circuit is connected to the magnetic field sensors 131 for reading the measured signals. Information embedded in the magnetic field signals about the object 160, such as flaw locations or local material property change, are extracted by graphic computing algorithms. In the inspection process, the object 160 is scanned line-by-line by the sensing portion 130 while moving the eddy current probe in the X-axis direction as indicated by arrow 191 in FIG. 1A.

In a further exemplary embodiment, the array of magnetic field sensors 131 are placed in proximity to the primary surface 141 but not all of them are positioned on the lines normal to the primary surface 141 at the symmetric centers of the square grid shapes 150. Such off-center formation of the structure may produce a little background noise field interfering the magnetic field sensors 131 but simplify the assembly process. Such a background noise can be reduced by placing the magnetic sensors further away from the excitation coils in the probe structure. The tradeoff of this structure configuration is it also increases the distance between the object and the excitation coils and reduces the intensity of eddy current induced by the excitation coils, and therefore lowers the detectable magnetic field signals from the induced eddy current. This further exemplary embodiment is suitable for crude flaw inspection process that does not require very high and fine tuned detection sensitivity.

In a further exemplary embodiment, a part of excitation coils, of which on the primary surface 141 are made in the form as being fabricated on a planar printed circuit board, and the rest of excitation coils (i.e., excitation coils on surfaces 142, 143 and 144) are replaced by lead wires.

In a further exemplary embodiment, the geometrical angle $|\alpha-\beta|$ between two excitation coils on the primary surface 141 takes any value between 0 and 180 except 90 degrees. Many congruent parallelogram grid shapes, instead of square grid shapes, are formed on the primary surface 141. Such structure of excitation coils may require more sophisticated computing algorithm to precisely calculate and locate the flaw but it also may largely simplify the assembly process. The 90-degree phase shift AC currents in the excitation coils 121 and 122 produces a rotating magnetic field and induces a rotating eddy current in the area of the object being inspected, but the trajectory of the magnetic field vector and the trajectory of the eddy current vector does not trace a circle in X-Y plane as does the first exemplary embodiment. Instead, they leave a trace of ellipse. Since the induced eddy current still rotates in X-Y plane, this exemplary embodiment is conformingly sensitive to flaws oriented in any direction in X-Y plane.

In a further exemplary embodiment, the first excitation coil 121 and the second excitation coil 122 are supplied with two of the same AC currents as in the first exemplary embodiment but the phase shift can be any value between 0 and 180 except 90 degrees. Similar to the aforementioned exemplary embodiment, the 90-degree physical angle between the two excitation coils and the non-90-degree phase shift of the two currents in coil 121 and coil 122 produces a rotating magnetic field and induces a rotating eddy current in the area of the object being inspected, but the trajectory of the magnetic field vector and the trajectory of the eddy current vector traces an ellipse, instead of a circle in the X-Y plane. Similarly, since the induced eddy current still rotates in X-Y plane, this exemplary embodiment of the eddy current probe is conformingly sensitive to flaws oriented in any direction in X-Y plane.

In a further exemplary embodiment, the first excitation coil 121 and the second excitation coil 122 are supplied with two AC currents with the same frequency and 90 degrees of phase shift as in the first exemplary embodiment but different magnitudes. Similar to the aforementioned first exemplary embodiment, the two AC currents produce a rotating magnetic field that induces a rotating eddy current in the vicinity area of the object being inspected. The trajectory of the magnetic field vector and the eddy current vector traces an ellipse instead of a circle in the X-Y plane. Similarly since the induced eddy current rotates in X-Y plane, this exemplary embodiment of the eddy current probe is conformingly sensitive to flaws oriented in any direction in X-Y plane.

In a further exemplary embodiment, magnetic field shields are installed in order to prevent the magnetic field sensors from being interfered by the excitation field produced by the conductors of the excitation coils on the surfaces 142, 143 and 144.

In a further exemplary embodiment, the excitation portion 120 consists of three or more sets of excitation coils. They form the same geometrical angle from one set of coil to another on the primary surface 141 and are supplied with the same phase shift from one current to another which is equal to 180 degrees divided by the number of coils. Take three excitation coils as an example, three sets of excitation coils are wound along the square bar core 140 and form a mutual geometrical angle of 60 degrees on the primary surface 141. The three excitation coils are energized by three AC currents which are equal in magnitude and frequency but have a mutual phase shift of 60 degrees from one to another. Such a three-coil structure with the three-phase AC current feed produces the same rotating magnetic field in X-Y plane in the area of the object being inspected, as the two-coil structure does in the first exemplary embodiment.

In a further exemplary embodiment, more than one sensing portion 130 is included in one eddy current probe 110. The magnetic field sensors are arranged into array units each of which contains multiple sensors. Depending on the need, the array units can function either in a simultaneous mode or in a time-multiplexed mode.

Figure 3A:
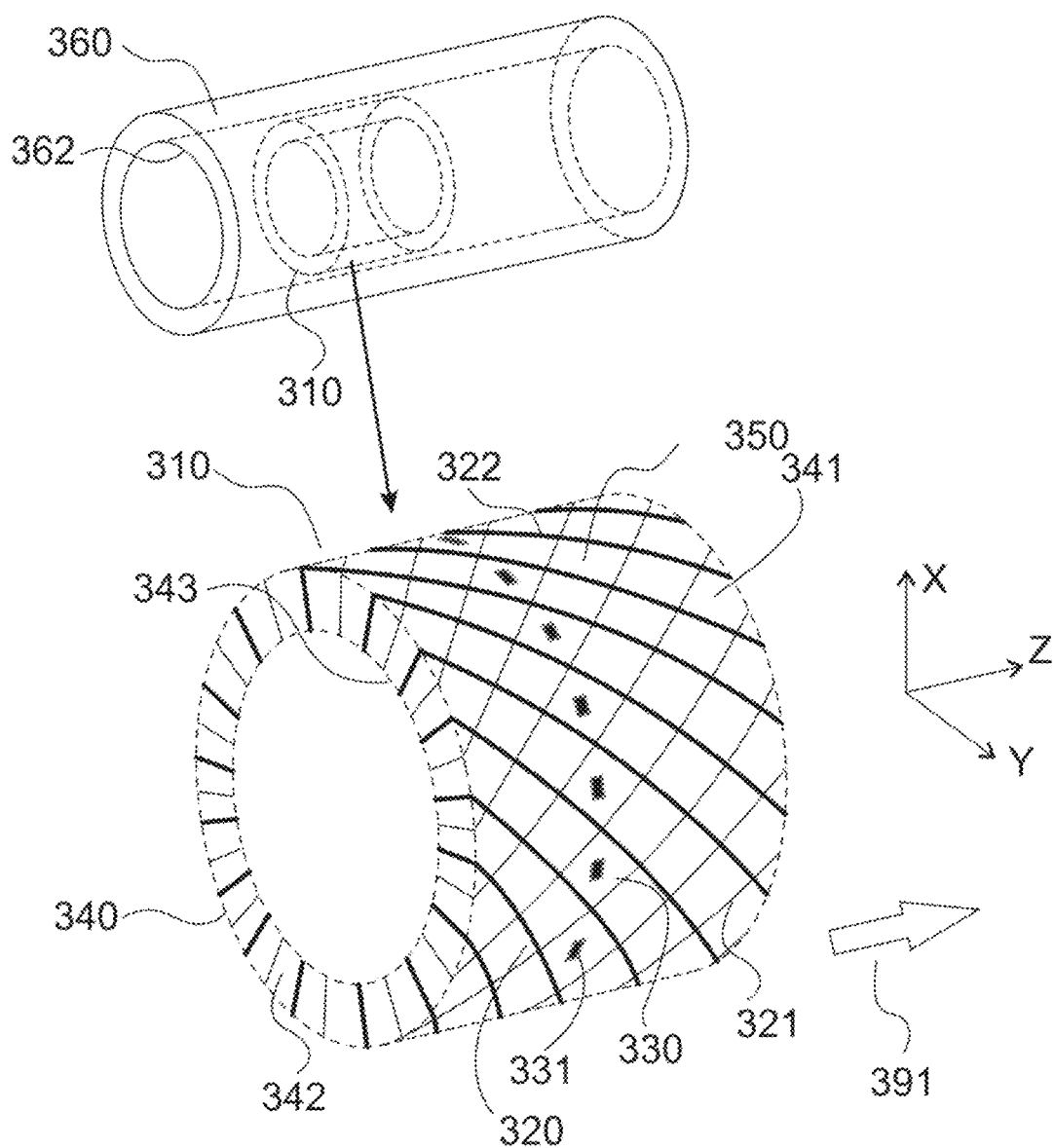
FIG. 3A is a 3D view of a second exemplary embodiment of the present invention, the eddy current probe suitable for using inside a tube or on an object with a curved surface.
Figure 3B:
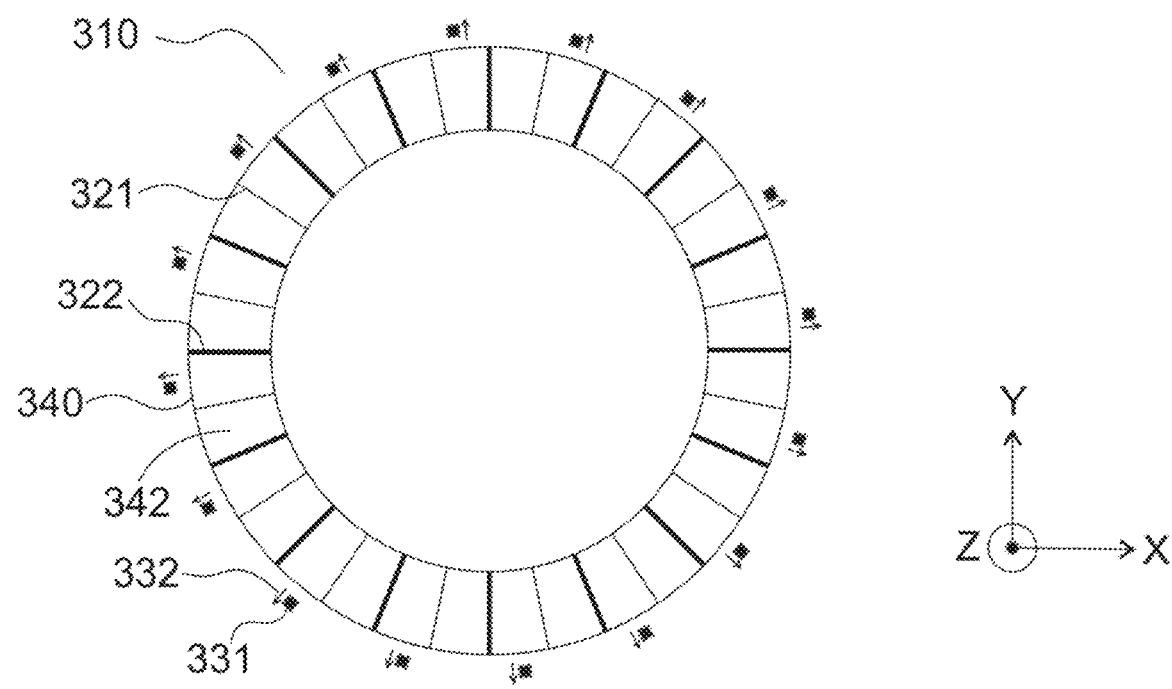
FIG. 3B is a side view of the second exemplary embodiment.

FIG. 3A and 3B show a structure configuration of a second exemplary embodiment of the present invention that is suitable being operated inside a tube or on an object with a curved surface. As shown in FIG. 3A, an eddy current probe 310 in accordance with this exemplary embodiment comprises an excitation portion 320 for inducing an eddy current in the wall of an object tube 360, and a sensing portion 330 for detecting the magnetic field produced by the induced eddy current. The tube 360 is made of an electrically conductive material herein for an example. The inner surface 362 of the object tube 360 is radially symmetric with respect to the Z-axis, which is the axial direction of the object tube 360, as shown in FIG. 3A.

The excitation portion 320 consists of a first excitation coil 321, a second excitation coil 322, and a tubular core 340 as an example made of a nonmagnetic substance with its outer radius of curvature fits the inner radius of curvature of the object tube 360. Each coil is formed by winding a conductor along the tubular core 340 in the circumferential direction, with each wound equally spaced on the surfaces 341, 342, 343 and 344 of the core. Surfaces 342 and 344 are both orthogonal to Z-axis, and surfaces 341 and 343 are both orthogonal to the radial direction and parallel to the inner surface 362 of the object tube 360. The surface 341, which is the outer surface of the core 340, faces to the inner surface 362 of the object tube 360 and is called the primary surface in our description. The surfaces and the core are outlined in dashed lines shown in FIG. 3A. The windings on the surfaces 343 and 344 are omitted in FIG. 3A for clarification viewing the figure. On the primary surface 341, conductors of coil 321 cross the conductors of coil 322 in 90 degree angles from each other forming many congruent quasi-square grid shapes 350. Different from those square grid shapes 150 in the first exemplary embodiment, these quasi-square grid shapes are not in the same plane or parallel to each other.

The sensing portion 330 consists of a plurality of magnetic field sensors 331, which can be selected from a variety of magnetic sensing apparatus. These magnetic field sensors are placed in proximity to the primary surface 341 and on the normal lines of the primary surface 341 at the symmetric centers of the aforementioned quasi-square grid shapes 350. As shown in FIG. 3A, the magnetic field sensors are also disposed along the circumferential direction of the core, forming a ring-like arrangement on the circumference of the primary surface 341, which covers the full range (360 degrees) around the object tube being inspected. Each sensor 331 has one sensitivity axis and is placed with its sensitivity axis aligned with the radial direction (i.e., the normal to the primary surface 341), as shown by the arrows 332 in FIG. 3B. All sensors only respond to the radial component of a magnetic field with their sensitivity axes aligning to the radial direction and the magnetic signals are converted to electrical output signals in the end.

In accordance with this exemplary embodiment and similarly to the first embodiment, the radial component of the excitation magnetic field can be avoided by placing the sensors on the normal lines of the primary surface 341 at the symmetric centers of the quasi-square grid shapes 350, because at these positions the radial components of the excitation magnetic field from each of two pairs of adjacent parallel conductors cancel out from each other due to the symmetry of these quasi-square grid shapes. The resultant radial component of the excitation magnetic field is nearly net zero at sensor positions. Because the magnetic field sensors are chosen only to be sensitive to radial magnetic field, they are immune to the interference from the excitation field that does not have a radial component. Therefore, the magnetic field sensors 331 evidently work in a region without having to consider its nonlinearity and free of saturation and so as to significantly increase their overall measuring accuracy.

In accordance with this exemplary embodiment, the excitation coils 321 and 322 are energized by two out-of-phase AC currents with different magnitudes and phase shifts in general. As an exemplary embodiment, these two applied AC currents may have the same magnitude and frequency with 90 degrees of phase shift. Because of the pre-designed structure, a rotating excitation magnetic field is produced and a rotating eddy current inside the wall of the object tube is induced in the vicinity of the focused area of the object tube. At any point of the wall, both of the excitation magnetic field and eddy current rotates as if in a plane tangent to the arc where the sensor locates and orthogonal to the radial direction. The induced eddy current in turn produces another magnetic field. The change in the path of the eddy current due to the existence of flaws in the object tube leads to a variation of the magnetic field produced by the eddy current and can be detected by the magnetic field sensors 331. Since the induced eddy current inside the wall of the object tube 360 rotates as if in a plane tangent to the arc where the sensor locates and orthogonal to the radial direction, the eddy current probe 310 is sensitive to flaws oriented in any direction in this plane depicted by the orthonormal circumferential and axial directions.

During the application of flaw inspection in the object tube 360, the eddy current probe 310 is connected to AC power sources for supplying the two AC currents with 90-degree phase shift to the excitation coils 321 and 322, respectively. A receiver circuit is connected to the magnetic field sensors 331 for reading the measured signals. Information embedded in the magnetic field signals about the object tube 360, such as flaw locations or local material property change, are extracted by graphic computing algorithms. In the inspection process, the object tube 360 is scanned step-by-step by the sensing portion 330 while moving the eddy current probe in the axial direction (Z-axis) as indicated by arrow 391 in FIG. 3A.

In a further exemplary embodiment, the magnetic field sensors 331 only cover a portion (for example, 90 degrees) other than the full range of the circumference on the primary surface 341, depending on the portion of the object tube that is to be inspected.

In a further exemplary embodiment, the magnetic field sensors 331 are arranged along the axial direction, other than the circumferential direction, on the primary surface 341. In the inspection process, the object tube is scanned step-by-step along the circumference by rotating the eddy current probe inside the object tube. The scan can also be performed along a helical direction in order to cover the whole tube.

In a further exemplary embodiment, the shape of the eddy current probe 310 is adjusted to be fit to the radius curvature of any non-planar or curved object that is to be inspected. The configuration of excitation coils and magnetic field sensors in the second exemplary embodiment still applies to such situations.

Not all details of the second exemplary embodiment are repeated herein however, it should be understood that all exemplary embodiments concepts aforementioned for the first exemplary embodiment, including the modifications made on the sensor position, the excitation coil structure and geometry, the phase shift and magnitude of applied AC currents, the shields installed on the magnetic field sensors, the quantity of excitation coils, and the array arrangement of magnetic field sensors also apply to the second exemplary embodiment.

In all exemplary embodiments above, the applied magnetic field sensors can be selected from a group of magnetic sensing apparatus of, but not limited to, Hall-effect sensors, giant magnetoresistive (GMR) sensors, tunnel magnetoresistive (TMR) sensors, anisotropic magnetoresistive (AMR) sensors, colossal magnetoresistive (CMR) sensors, and inhomogeneity-induced magnetoresistive (IMR) sensors. In addition, the magnetic field sensors can be implanted individually or in combination of multiple apparatuses, for example, forming a Wheatstone bridge. Surface mounted die level magnetic field sensors can be assembled on a conventional or flexible printed circuit board through wire bonding. Alternatively, the magnetic field sensors can be monolithically integrated on a substrate such as a silicon substrate through microfabrication techniques. The total number of magnetic field sensors can be chosen depending on the structure and dimensions of the object being inspected, and the resolution of the eddy current probe that is required.

The exemplary embodiments described herein are intended to be exemplary only. The person with the ordinary skill in the art will understand and appreciate the existence of variations, combinations, and equivalents of the specific exemplary embodiments. The invention should therefore not to be limited by this specific exemplary embodiments, but by all exemplary embodiments and intended methods used within the scope of this invention.

What is claimed is:

1. An eddy current probe for nondestructive evaluation of an object made of an electrically conductive material with a planar surface, comprising:
    an excitation portion, consisting of a plurality of multi-turn conductive coils and a bar core, said core having a substantially planar primary surface in proximity to the outer surface of said object to be inspected, each said multi-turn coil formed by winding a conductor along said core with each wound equally spaced and parallel on said substantially planar primary surface of the core, said plurality of multi-turn coils intersecting from one to another on said substantially planar primary surface of said core and forming a plurality of congruent grid shapes with the winding conductors, each said multi-turn coil is energized by an AC current with each of said AC currents at a phase difference from one to another;
    a sensing portion, consisting of a plurality of magnetic field sensors with each of the sensors positioned in proximity to the symmetric center of said congruent grid shapes, each said magnetic field sensor having a sensitivity axis is placed with said sensitivity axis in the direction substantially orthogonal to said primary surface.

2. The eddy current probe of claim 1, wherein each of said magnetic field sensors is positioned on a line normal to the primary surface at the symmetric center of said congruent grid shapes.

3. The eddy current probe of claim 1, wherein each of said magnetic field sensors is positioned within said congruent grid shapes and is not at the symmetric center of said congruent grid shapes.

4. The eddy current probe of claim 1, wherein each said multi-turn coil intersecting another at the same geometrical angle on said substantially planar primary surface with said geometrical angle equal to 180 degrees divided by the number of coils, and said AC currents have the same phase difference from one to another with said phase difference equal to 180 degrees divided by the number of AC currents.

5. The eddy current probe of claim 1, wherein the number of said plurality of multi-turn coils is two, said geometrical angle is anything between zero to 180 degrees except 90 degrees, and the number of said AC currents is two with said phase difference equal to 90 degrees.

6. The eddy current probe of claim 1, wherein the number of said plurality of multi-turn coils is two, said geometrical angle is anything between zero to 180 degrees except 90 degrees, and the number of said AC currents is two with said phase difference equal to a number between zero to 180 degrees except 90 degrees.

7. The eddy current probe of claim 1, wherein the said applied AC currents may have the same or different magnitudes.

8. The eddy current probe of claim 1, wherein the portion of said multi-turn coils on said primary surface is made on a substantially planar multi-layer printed circuit board, and the rest of the coil wires are replaced by lead wires.

9. The eddy current probe of claim 1, wherein said magnetic field sensors are selected from a group of sensing apparatuses of, but not limited to Hall-effect sensors, giant magnetoresistive (GMR) sensors, tunnel magnetoresistive (TMR) sensors, anisotropic magnetoresistive (AMR) sensors, colossal magnetoresistive (CMR) sensors, and inhomogeneity-induced magnetoresistive (IMR) sensors.

10. The eddy current probe of claim 1, wherein the material of said bar core is or contains, but not limited to, air.

11. An eddy current probe for nondestructive evaluation of an object made of an electrically conductive material with a curved surface, comprising:
    an excitation portion, consisting of a plurality of multi-turn conductive coils and a bar core, said core having a curved primary surface in proximity to the curved outer or inner surface of said object to be inspected, each said multi-turn coil formed by winding a conductor along said core with each wound equally spaced on said curved primary surfaces of the core, said plurality of multi-turn coils intersecting from one to another on said curved primary surface of said core and forming a plurality of congruent grid shapes with the winding conductors, each said multi-turn coil is energized by an AC current with each of said AC currents at a phase difference from one to another;
    a sensing portion, consisting of a plurality of magnetic field sensors with each of the sensors positioned in proximity to the symmetric center of said congruent grid shapes, each said magnetic field sensor having a sensitivity axis is placed with said sensitivity axis in the direction substantially orthogonal to said curved primary surface.

12. The eddy current probe of claim 11, wherein each of said magnetic field sensors is positioned on a line normal to the primary surface at the symmetric center of said congruent grid shapes.

13. The eddy current probe of claim 11, wherein each of said magnetic field sensors is positioned within said congruent grid shapes and is not at the symmetric center of said congruent grid shape.

14. The eddy current probe of claim 11, wherein each said multi-turn coil intersecting another at the same geometrical angle on said curved primary surface with said geometrical angle equal to 180 degrees divided by the number of coils, and said AC currents have the same phase difference from one to another with said phase difference equal to 180 degrees divided by the number of AC currents.

15. The eddy current probe of claim 11, wherein the number of said plurality of multi-turn coils is two, said geometrical angle is anything between zero to 180 degrees except 90 degrees, and the number of said AC currents is two with said phase difference equal to 90 degrees.

16. The eddy current probe of claim 11, wherein the said applied AC currents may have the same or different magnitudes.

17. The eddy current probe of claim 11, wherein the portion of said multi-turn coils on curved primary surface is made on a curved multi-layer printed circuit board, and the rest of the coils wires are replaced by lead wires.

18. The eddy current probe of claim 11, wherein said magnetic field sensors are selected from a group of sensing apparatuses of, but not limited to Hall-effect sensors, giant magnetoresistive (GMR) sensors, tunnel magnetoresistive (TMR) sensors, anisotropic magnetoresistive (AMR) sensors, colossal magnetoresistive (CMR) sensors, and inhomogeneity-induced magnetoresistive (IMR) sensors.

19. The eddy current probe of claim 11, wherein the material of said bar core is or contains, but not limited to, air.

20. The eddy current probe of claim 11, wherein said object is a tube, said bar core is a tubular bar core, and said plurality of magnetic field sensors are arranged inline either along the axial direction or circumferential direction of said tube.

* * * * *